United States Patent [19]

Arai et al.

[11] Patent Number: 4,611,335
[45] Date of Patent: Sep. 9, 1986

[54] DIGITAL DATA SYNCHRONIZING CIRCUIT

[75] Inventors: Takao Arai; Masaharu Kobayashi, both of Yokohama; Takashi Takeuchi, Fujisawa; Eiji Okubo; Hiroshi Endoh, both of Toyokawa, all of Japan

[73] Assignee: Hitachi, Ltd., Tokyo, Japan

[21] Appl. No.: 422,190

[22] Filed: Sep. 23, 1982

[30] Foreign Application Priority Data

| Sep. 30, 1981 | [JP] | Japan | 56-153700 |
| Sep. 30, 1981 | [JP] | Japan | 56-153705 |
| Oct. 14, 1981 | [JP] | Japan | 56-162835 |
| Oct. 14, 1981 | [JP] | Japan | 56-162836 |
| Oct. 14, 1981 | [JP] | Japan | 56-162837 |
| Oct. 14, 1981 | [JP] | Japan | 56-162838 |

[51] Int. Cl.⁴ .............................................. H04L 7/02
[52] U.S. Cl. .................................... 375/110; 375/104; 328/110; 328/129.1; 307/522
[58] Field of Search ............... 375/110, 106, 108, 96, 375/100, 104, 117, 22, 114, 116; 360/51, 44, 41; 328/63, 110, 129.1; 307/510, 520, 522; 329/126, 128; 370/100

[56] References Cited

U.S. PATENT DOCUMENTS

| 3,518,554 | 6/1970 | Gabor | 328/110 |
| 3,549,804 | 12/1970 | Greenspan | 375/110 |
| 3,619,505 | 11/1971 | Meile | 375/110 |
| 3,745,248 | 7/1973 | Gibson | 375/110 |
| 3,949,199 | 4/1976 | Odom | 375/22 |
| 4,218,770 | 8/1980 | Weller | 375/110 |
| 4,227,251 | 10/1980 | Kazama et al. | 375/110 |
| 4,232,197 | 11/1980 | Acampora et al. | 370/97 |
| 4,385,395 | 5/1983 | Tanaka et al. | 375/110 |
| 4,501,000 | 2/1985 | Immink et al. | 375/25 |

FOREIGN PATENT DOCUMENTS

| 1560698 | 2/1980 | United Kingdom | 375/110 |
| 434599 | 11/1974 | U.S.S.R. | 375/104 |

Primary Examiner—Robert L. Griffin
Assistant Examiner—Raymond C. Glenny
Attorney, Agent, or Firm—Antonelli, Terry & Wands

[57] ABSTRACT

A circuit for reproducing a signal associated with synchronization with a digital data signal. The digital data signal includes a combination of a plurality of pulses each having a predetermined pulse width. The reproducing circuit comprises a logic circuit for discriminating the pulse width of at least one of the plurality of pulses, an oscillator and a frequency divider connected with the oscillator and responsive to the output of the logic circuit to generate a clock signal timed with the output of the logic circuit.

9 Claims, 37 Drawing Figures

DIGITAL DATA SYNCHRONIZING CIRCUIT

This invention relates to a digital data synchronizing circuit for use in a signal reproducing apparatus for a compact digital audio disk, and the like.

PCM for signal processing of digital signals to which analog signals are converted is widely used for transmission, recording and reproducing of signals. An application of PCM to audio equipment is a compact digital audio disk.

The clock for the reproduction of digital signals recorded in the disk may be generated by a specific digital data synchronizing circuit. This digital data synchronizing circuit produces a clock of a constant period during the interval between the reset conditions. The effective way of resetting used so far is an all edge resetting system in which the resetting is surely made when the digital signal is inverted from level "H" to "L" or level "L" to "H".

FIG. 1 is a conventional circuit diagram of this type. Shown at 33 is an oscillation circuit for oscillating at frequency of N/T, 34 a frequency divider for dividing the frequency of the output of the oscillator 33 by a factor of N, 7 the output of the frequency divider 34 which is used as a clock of frequency of 1/T for data reproduction, 6 an input binary data signal, 53 a delay circuit, 30 an exclusive OR circuit supplied with the input data 6 and the output of the delay circuit 53, the output of the exclusive OR circuit being supplied to the frequency divider 34 as a reset signal thereto. A latch 136 is supplied with the input data signal 6 and the output 7 of the frequency divider 34 as a clock, and produces an output 137 as a result of discriminating the level "1" or "0" of the input data 6 at the timing of the output 7.

The operation of the arrangement of FIG. 1 will be described with reference to FIG. 2. In FIG. 2, T represents the correct period of one bit of the input signal, or unit clock period, (A) shows the input signal 6, (B) the output of the exclusive OR circuit 30, (C) the clock signal 7, (D) the output 137 of the latch 136 as a result of latching the input signal 6 in response to the clock signal 7, (E) the input signal 6 having a pulse with its trailing edge shifted backward from the normal position at time $t_1$, (F) the output of the exclusive OR circuit 30 supplied with the input signal 6 at (E), (G) the clock signal 7 associated with the input 6 at (E) and (H) the latch output produced when the input signal 6 at (E) is latched in response to the clock signal 7 at (G).

For the input signal 6 at (A) the waveform (D) of the latch output 137 is correct "10010" but for the input signal 6 at (E) the waveform (H) of the latch output 137 is erroneous "11010".

The width of each element of the input signal is sometimes changed by noise or various types of distortion occuring in the reproduction of the input signal. At (E) in FIG. 2, the data element is extended during the interval between $t_1$ and $t_2$ and in this case, at (H) the effect may appear and data reproduction may be erroneous.

It is an object of the invention to provide a digital data synchronizing circuit for stable reproduction of a signal associated with the synchronization of the digital data irrespective of the above distortion of the input signal.

The feature of this invention resides in the fact that it is checked whether the input signal is distorted or not, on the basis of the rule of digital data, and only when the input signal is normal, it is used as a reset signal to the frequency divider.

The invention will become more readily understood from the following exemplary description taken with the accompanying drawings, in which.

Figure 1:
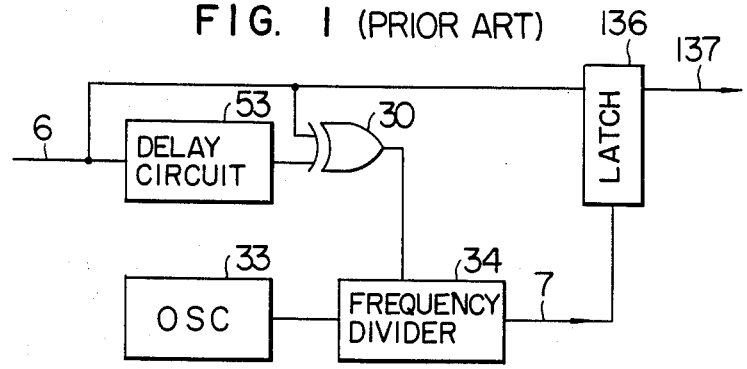
FIG. 1 is a circuit diagram of a conventional digital data synchronizing circuit.
Figure 2:
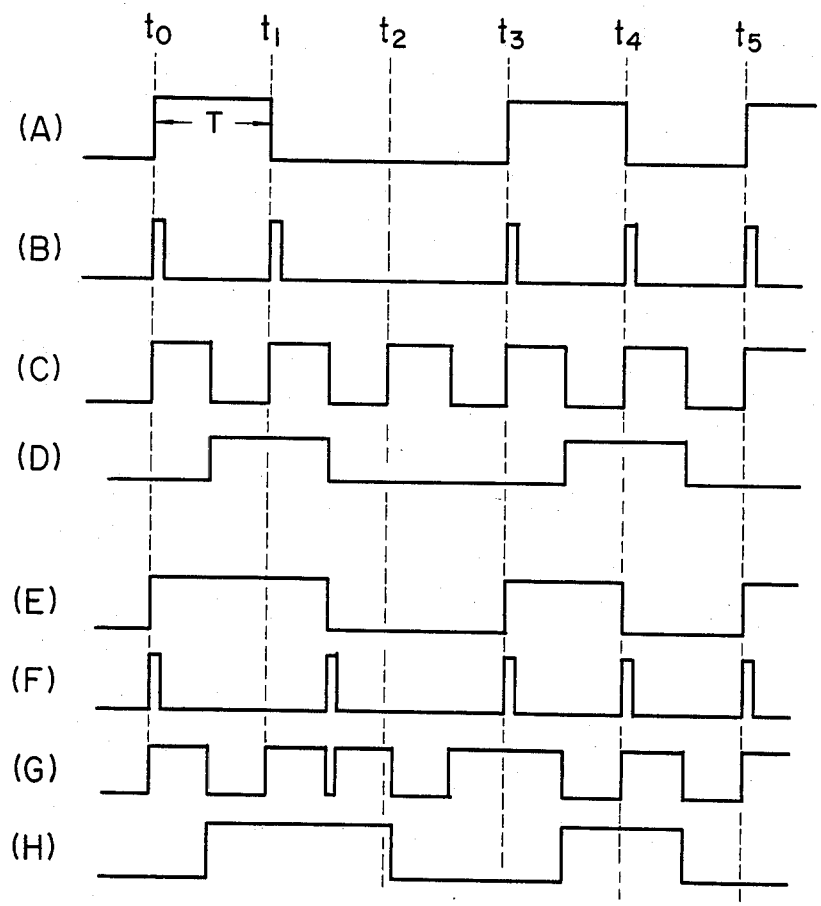
FIG. 2 is a waveform diagram useful for explanation of the operation of the circuit of FIG. 1.
Figure 3:
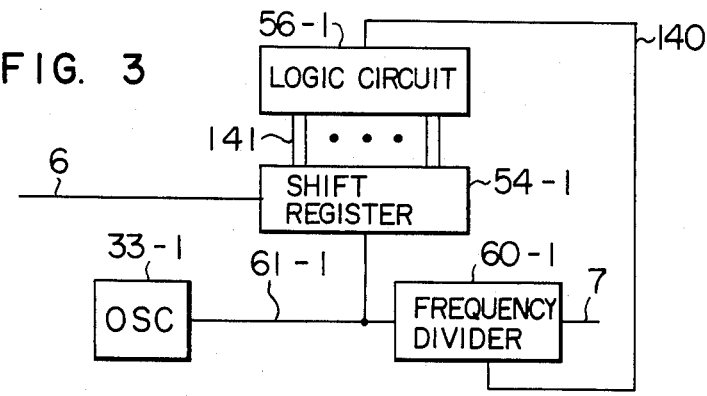
FIG. 3 is a circuit diagram of one embodiment of the invention.

Embodiments of this invention will be described in detail. FIG. 3 is a block diagram of the arrangement of a first embodiment according to this invention. Referring to FIG. 3, there are shown an oscillation circuit 33-1 which generates an output 61-1 of a frequency of $N_1/T$, and an $N_2$-stage shift register 54-1 supplied with an input signal 6 as data and the output 61-1 as a clock signal from the oscillation circuit 33-1 and which produces $N_2$ outputs 141. Shown at 56-1 is a logic circuit which is supplied with the outputs 141 from the shift register 54-1 and produces an output 140 which becomes "1" only when the outputs of the first stage and final stage of the shift register 54-1, of the outputs 141 are both "1" or "0" and the other outputs are all "0" or "1" and becomes "0" when such case does not occur. Shown at 60-1 is a frequency dividing circuit which is supplied with the output 61-1 from the oscillator 33-1 as an input signal to be counted and with the output 140 from the logic circuit 56-1 as a set or reset input.

The operation of the arrangement of FIG. 3 will hereinafter be described with reference to the waveform diagram of FIG. 4.

Figure 4:
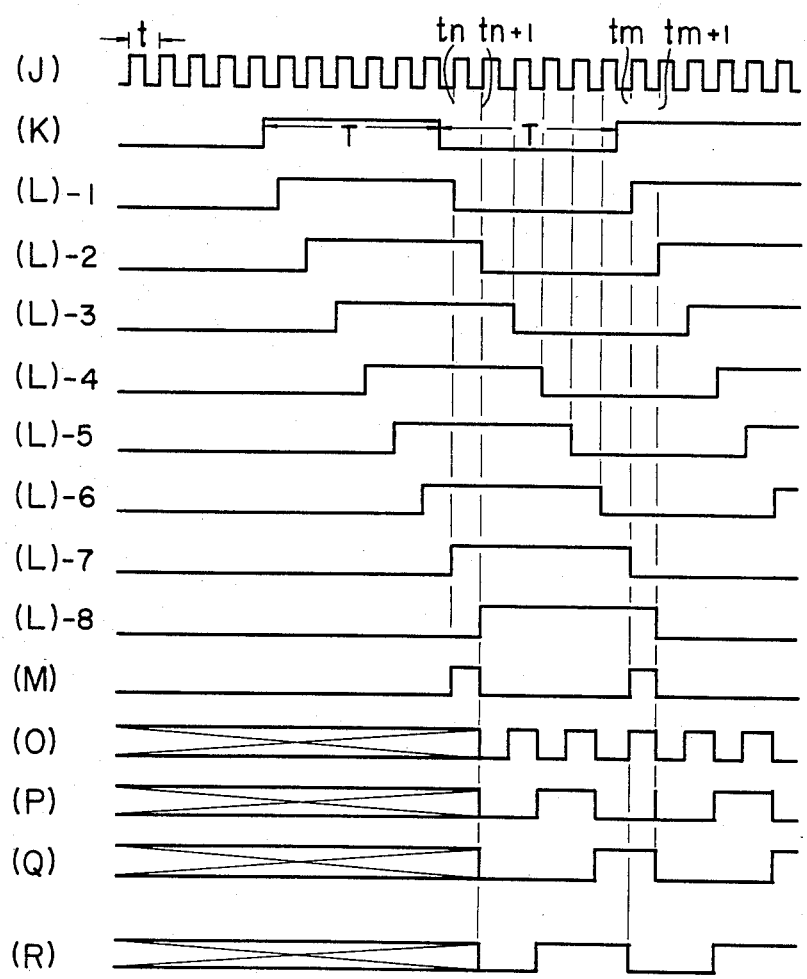
FIG. 4 is a waveform diagram useful for the explanation of the operation of the circuit of FIG. 3.

In FIG. 4, (J) shows the output 61-1 from the oscillator 33 and (K) shows the input signal 6. The period of the output 61-1 from the oscillator 33 is, for example, $t = T/N_1$ ($N_1 = 6$). Therefore, the number of stages of the shift register 54-1 is, for example, 8. Also, the shift register 54-1 operates at the leading edge of the clock input 61-1. The first, second, ... and eighth stages of the shift register 54-1 are represented by (L)-1, (L)-2, ... (L)-8.

(M) is the output 140 produced from the logic circuit when the input signal 6 and clock pulse 61-1 are (K) and (J), respectively. In other words, when the first stage output and the last stage output of the shift register 54-1 are both "1" or "0" and the other stage outputs are "0" or "1", the output (M) becomes "1".

The frequency divider 60-1 counts the clock pulse 61-1, and is set or reset by output 140 from the logic circuit 56-1. In FIG. 4, (O), (P) and (Q) show an example of the output waveform of each stage of the frequency divider 60-1, and (R) is the output 7 of the frequency divider 60-1. Before time $t_n$, the (O), (P), (Q) and (R) being dependent on the timing of the output 140 from the logic circuit 56-1 are shown as indefinite here.

The frequency divider 60-1 is a divide-by-six counter of three stages.

The output waveforms at the first, second and third stages of the frequency divider 60-1 are shown by (O), (P) and (Q) in FIG. 4, in which case the frequency divider 60-1 is operated at the leading edge of the clock pulse 61-1 and reset at the leading edge when the logic circuit output 140 is "1".

Thus, the frequency divider 60-1 produces output 7 in synchronism with the input signal 6 and in response to the period of the input signal.

Figure 5:
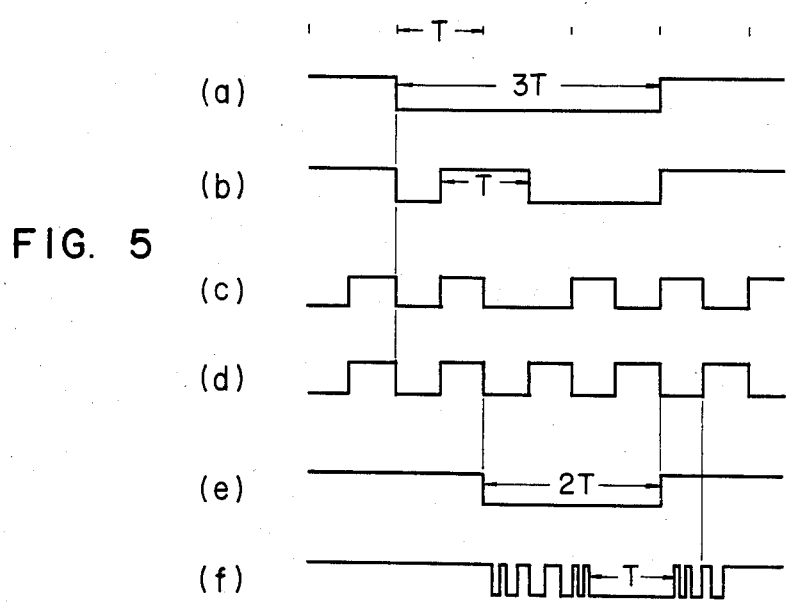
FIG. 5 is a waveform diagram for explanation.

However, if the input signal is disturbed by a dropout, waveform distortion or the like, the signal 7 synchronized with the input signal 6 as described above will not be obtained. This abnormal condition will be described with reference to the waveform diagram of FIG. 5.

The signal shown by FIG. 5a, when disturbed by a dropout, noise or the like on its transmission path, is changed to a waveform shown by FIG. 5b. When this waveform is applied as the input signal 6 to the shift register 54-1, the logic circuit 56-1 misreceives the T-width signal generated in the waveform of FIG. 5b by a dropout, noise or the like, allowing the frequency divider 60-1 to be synchronized with such error signal. As a result, the frequency divider 60-1 produces the output 7 of, for example, a waveform shown by FIG. 5c, not of the correct waveform shown by FIG. 5d. Thus, the output signal 7 has incorrect phase and period, and consequently, the input signal 6 cannot be received correctly. Similarly, when the signal shown by FIG. 5e is changed to the signal shown by FIG. 5f due to waveform distortion or the like, the T-width signal in the waveform of FIG. 5f causes a similar trouble.

In the logic circuit, if not only a single pulse width but pulse widths adjacent thereto are checked, misreception of an error signal will be reduced. In addition, if the clock itself is generated in synchronism, high-precision synchronization is possible.

Figure 6:
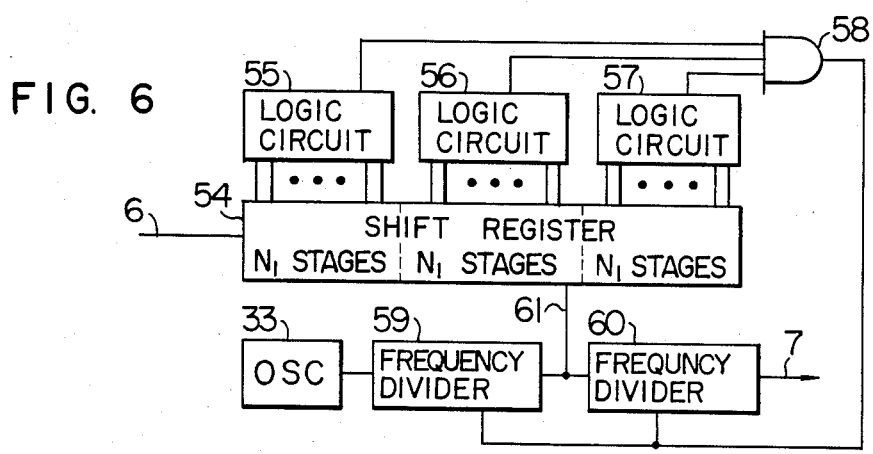
FIG. 6 is a block diagram of a second embodiment of the invention.

In this respect, a second embodiment of this invention will be described with reference to FIG. 6. FIG. 6 is a block diagram of the arrangement of the second embodiment of this invention. There are shown the data input signal 6, and an $N_1$-stage shift register 54 which is supplied with the data input signal 6 and detects $(n-1)$th pulse $T_{n-1}$ of a width longer than T, nth pulse $T_n$ of width T, and $(n+1)$th pulse $T_{n+1}$ of a width longer than T. Shown at 55 and 57 are logic circuits having $N_1$ inputs and which produce outputs of "1" when all the inputs are at "0", and 56 is a logic circuit having $N_1$ inputs and which produces an output of "1" when all the inputs are at "1". Shown at 58 is an AND circuit which is supplied with the outputs of the logic circuits 55, 56 and 57 and produces an output of "1" when all the inputs are at "1", 33 is an oscillation circuit which oscillates at a frequency of $N_0/T$, 59 is a frequency dividing circuit for dividing the frequency of the output from the oscillator 33 at a ratio of $N_0/N_1$ and 60 is a frequency dividing circuit for dividing the frequency of the output from the frequency divider 59 at ratio of $N_1$. Shown at a 61 is a signal of frequency $N_1/T$ which is produced from the frequency divider 59 and drives the shift register 54, and 7 identifies the output signal which is produced from the frequency divider 60 and is used as a clock of frequency 1/T for reproduction of data. The output from the AND circuit 58 is supplied to the dividers 59 and 60 as a reset signal.

Figure 7:
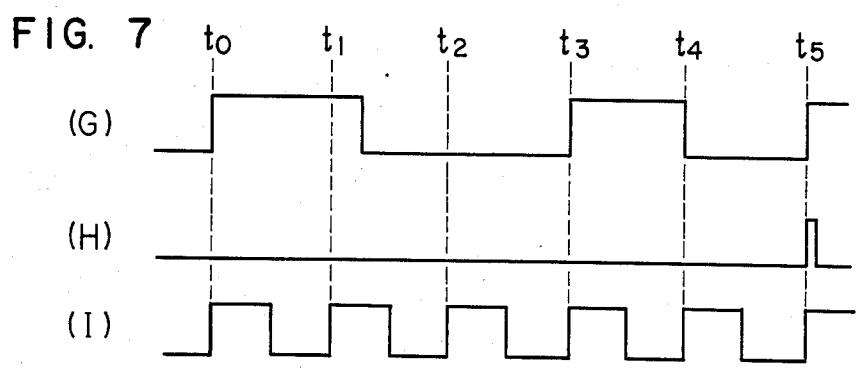
FIG. 7 is a waveform diagram for the explanation of the operation.

The operation of the arrangement of FIG. 6 will be described with reference to FIG. 7. Wherein the input signal 6 is shown at G, the output of the AND circuit 58 is shown at H and the clock signal 7 is shown at I. At time $t_1$ the signal G deviates backward in phase from the normal position, and the AND circuit 58 produces no output, thus the dividers 59 and 60 are not reset so that the clock signal 7 has its phase unchanged. During the time between $t_2$ and $t_3$, the logic circuit 57 detects the G being "0", during the time between $t_3$ and $t_4$ the logic circuit 56 detects the G being "1", and during the time between $t_4$ and $t_5$, the logic circuit 55 detects the G being "0". Thus, at time $t_5$ the AND circuit 58 produces an output, resetting the frequency dividers 59 and 60, but the clock signal 7 has its phase unchanged and thus is maintained as before. Therefore, the frequency dividers 59 and 60 continue their frequency dividing operation until the next output is supplied thereto from the AND circuit 58.

In accordance with this invention, a clock signal always synchronized with the input digital signal is easily obtained and since the pulse width which occurs at the highest frequency is examined, the quality of demodulated information on the basis of the clock signal can be improved remarkably; thus, the major problem in the prior art is solved.

In this embodiment, even if the input logical condition of the logic circuits 55 and 57 which produce output of "1" when all the inputs are "0" is interchanged with that of the logic circuit 56 which produces output of "1" when all the inputs are "1", the same effect can be achieved.

Although in this embodiment, the pulse widths smaller than T, T and larger than T which occur or appear at the highest frequency are examined, pulse widths of 3 to 11T are used in digital audio disk players, and so widths smaller than 3T, 3T and larger than 3T are examined.

Figure 8:
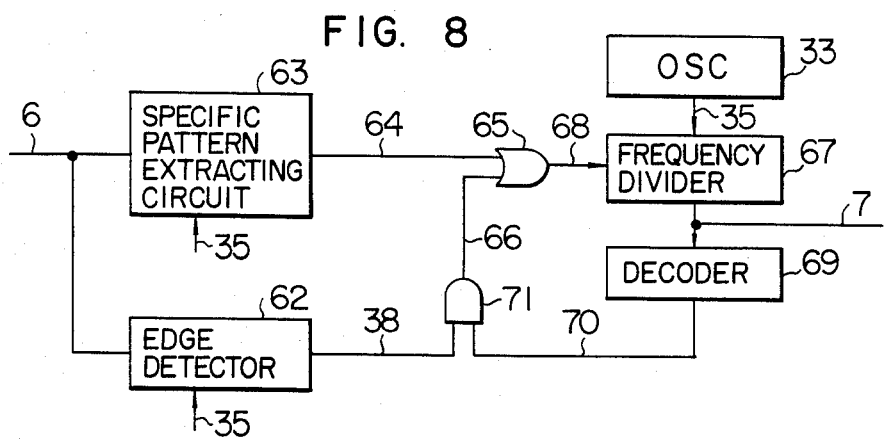
FIG. 8 is a block diagram of a third embodiment of the invention.

FIG. 8 is a circuit diagram of a third embodiment of this invention. This embodiment shows a data synchronizing apparatus for synchronization with the time base variation of input digital data.

Referring to FIG. 8, there are shown the input digital signal 6, an edge detecting circuit 62 for generating an edge signal 38 of the input signal, a particular pattern extracting circuit for extracting a particular pattern from the input signal 6 and producing a pattern extraction signal 64, an OR circuit for producing an OR output 68 in response to the inputs of the pattern extraction signal 64 and output 66 of an AND circuit 71, the oscillator 33 for oscillating at N times the frequency of the input digital signal, an output 35 from the oscillator 33 and a frequency dividing circuit 67 for dividing the frequency of the output 35 by a factor of N which is controlled by the OR output 68 to adjust the phase of the discrimination window signal 7 for discrimination of data. Shown at 69 is a decoder circuit for producing a time gate window signal 70, and an AND circuit 71 which is supplied with the edge signal 38 and the time gate window signal 70 and produces the output 66.

The operation of the embodiment of FIG. 8 will be described in detail with reference to the timing chart of FIG. 9.

Figure 9:
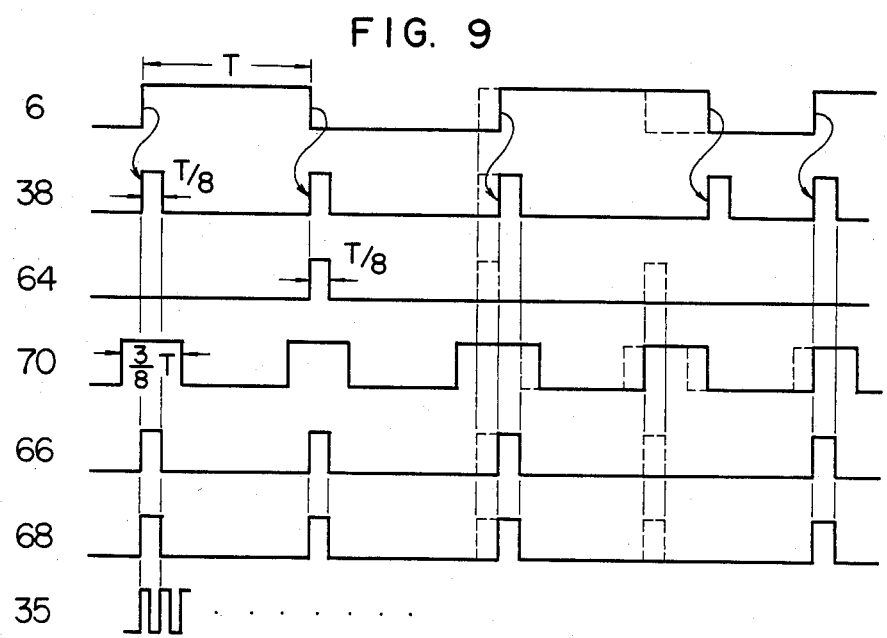
FIG. 9 is a timing diagram for the operation of this embodiment.

In the timing chart of FIG. 9, N is 8, T is a normal value of a distance between edges, a pattern of length T is extracted by the particular pattern extracting circuit 63, and the edges of the input digital signal 6 are shifted from the broken line position at the normal time to the solid line position by noise or the like.

Thus, the edge signal 38, and the pattern extraction signal 64 have a pulse width of T/8 according to the illustrated timing. The time gate window signal 70 can be extended in pulse width to the maximum length T in principle, but is necessary to reduce the range within which there is no adverse effect on the discrimination of data. In this embodiment, the edge signal 38 is normally expected to lie around T/8 of the center value of the time gate window signal 70, but since the deviation of the edge signal 38 is allowed within ±T/8 region, the time gate window signal 70 is made to have a pulse width of ⅜ T and waits for the input of the edge signal 38. Thus, even if a width is added to the time gate window signal 70, there is only a small effect on the data discrimination window signal 7.

If only the pattern extraction signal 64 produced from the pattern extracting circuit 63 is expected when the time base change of input data is large, the frequency at which the output 70 is produced from the decoder 69 is reduced, and the circuit may lose synchronization. Therefore, if the time gate window signal 70 is extended in width to ±T/8 within which there is only a small effect on the data discrimination window signal 7, the edge signal 38 of the input digital signal can be inputted for synchronization and thus the occurence frequency of the OR output 68 is not reduced. In this way, even when the time base change of input data is large, there is no problem.

Figure 10:
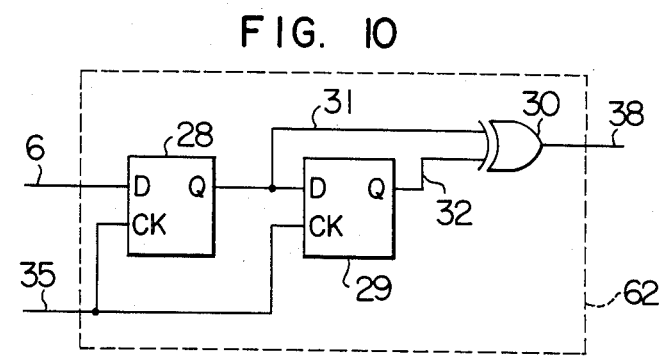
FIG. 10 is a circuit diagram of the edge detecting circuit in FIG. 8.

The edge detecting circuit 62 will be described in detail with reference to the circuit diagram of FIG. 10.

The input digital signal 6 is supplied to a first-stage D-flip-flop 28, the output 31 of which is supplied to a second-stage D-flip-flop 29, which then produces an output 32. The outputs 31 and 32 are supplied to an exclusive OR circuit 30, which produces the edge signal 38. The output 35 is applied to the clock input ends of the D-flip-flops 28 and 29.

Figure 11:
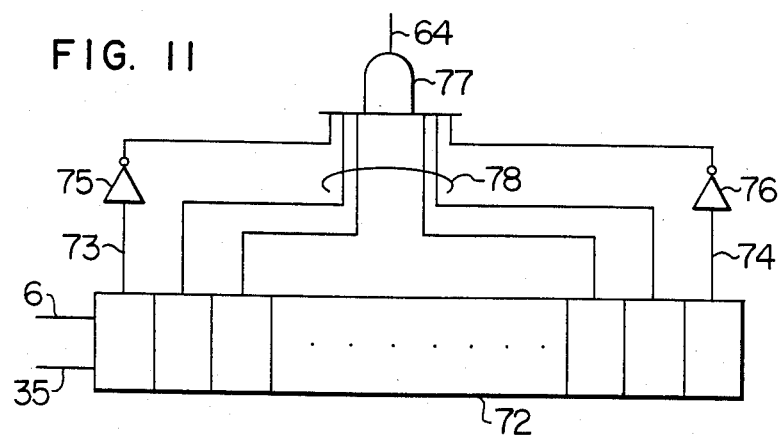
FIG. 11 is a circuit diagram of a specific pattern extracting circuit in FIG. 8.

The specific pattern extracting circuit 63 will be described in detail with reference to FIG. 11. The input digital signal 6 is supplied to a 10-stage shift register 72. The first-stage output 73 and the final stage output 74 are inverted by inverters 75 and 76, respectively and then supplied to an input AND circuit 77. The other 8-stage outputs 78 of the shift register 72 except the first- and last-stage outputs are directly supplied to the input AND circuit 77.

In accordance with this invention, even when the time base variation of the input data is large, the edge signal of the input digital signal and the time gate window signal into which the output of the frequency divider is decoded by a decoder are supplied to and AND circuit, the output of which is supplied to an OR circuit together with the output from a specific pattern extracting circuit, and the output of the OR circuit is supplied to the frequency divider, so that synchronization is made without reduction of occurrence frequency of synchronization input. When the time base variation of input data is small, a specific pattern is extracted with a precision of T/8 as in the embodiment, and the time gate window including the extremities of ±T/8 has only a small effect on the data discrimination window signal.

Figure 12:
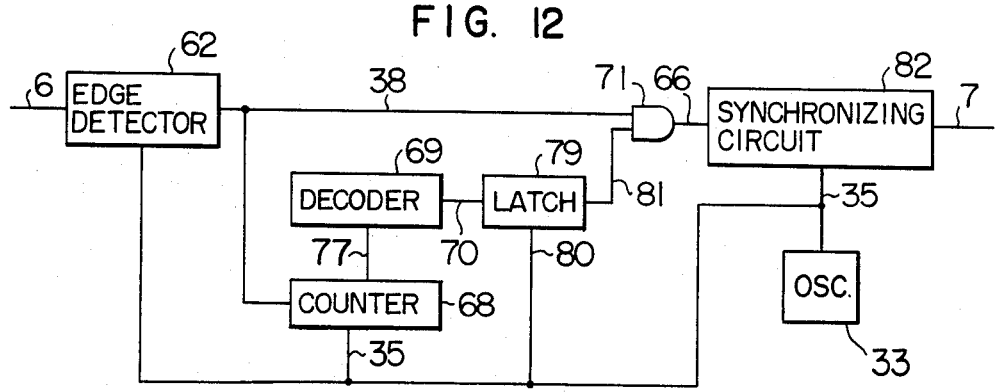
FIG. 12 is a block diagram of a fourth embodiment of this invention.

FIG. 12 shows a fourth embodiment of this invention, in which the edge distance is gated by a counter and thus a relatively long edge distance is also possible with ease. If, for example, the edge distance is 88 clocks, an 88-stage shift register must be provided for the pattern coincidence system, but it can be replaced by a 7-bit counter. The input digital signal 6 is supplied to the edge detecting circuit 62, which produces the edge signal 38. This edge signal 38 is used to reset a counter circuit 68. This counter 68 counts the signal 35 during the time other than the reset period. The output 77 from the counter 68 is decoded by the decoder 69 to produce the decoded output 70, which is latched by a latch circuit 79 in response to a signal 80. The output 81 from the latch circuit 79 and the edge signal 38 are supplied to the AND gate 71, which produces the coincidence output 66. This output 66 is supplied to a synchronizing circuit 82 together with the clock pulse 35 to produce the data strobe pulse 7.

Figure 13:
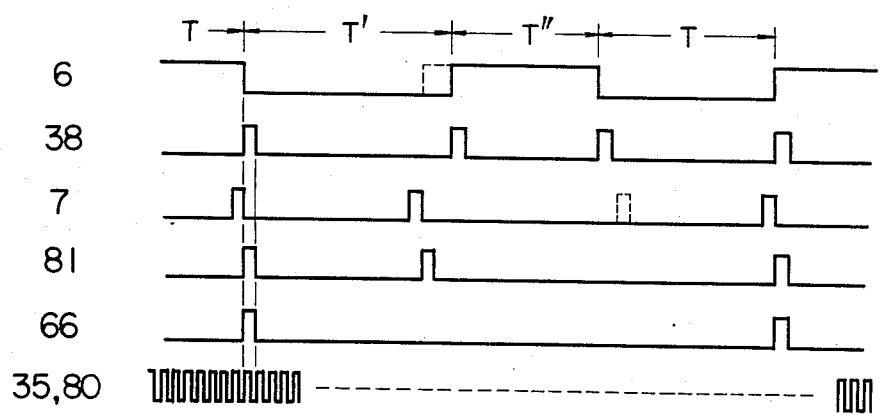
FIG. 13 is a timing chart for the operation of this embodiment.

The operation of the arrangement of FIG. 12 will be described with reference to the timing chart of FIG. 13, in which the input digital signal 6 is shifted from the normal edge shown by broken line to an edge by noise or the like, and the edge distance T in the input signal is normal with the condition of T≠T'≠T''. In FIG. 13, there are shown the edge output 38 obtained from detection of the input signal, the output 70 of the decoder 69 to which the output of the counter 68 reset by the edge output 38 is applied, the latch output 81 produced from the latch circuit 79 to which the output of the decoder is applied, and the coincidence output 66 between the latch output 81 and the edge output 38. The signal 66 is supplied to the synchronizing circuit 82, thereby preventing the synchronization from being disturbed by noise or the like. Here, the decoded value from the decoder 69 is, for example, one clock shorter than the normal edge distance and the output 81 from the latch circuit 79 is made in phase with the edge signal of normal edge distance.

Figure 14A:
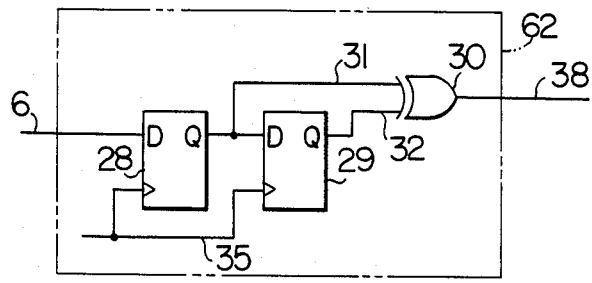
FIGS. 14a and 14b are circuit diagrams of an edge detecting circuit.
Figure 14B:
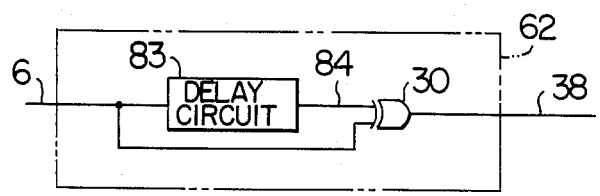

The edge detecting circuit 62 will be described in detail with reference to FIGS. 14a and 14b. The basic arrangement of the edge detecting circuit 62 is shown in FIG. 14b. The input digital signal 6 is delayed by a delay circuit 83 from which a delayed output 84 is produced. This delayed output 84 and the input digital signal 6 are supplied to an E- OR circuit 30 to produce an output as the edge signal 38. The width of the edge signal is determined by the amount of delay which the delay circuit 83 provides. The delay circuit 83 may be a delay element such as delay line, a shift register, or the like. Use of a shift register for the delay circuit is shown in FIG. 14a.

The input digital signal 6 is supplied to a first stage D-flip-flop 28, the output 31 of which is supplied to a second-stage D-flip-flop 29 to produce an output 32. These outputs 31 and 32 are supplied to the E-OR circuit 30 to produce the edge output 38. The width of the edge output 38 is equal to the period of the clock pulse 35 to the D-flip-flops 28 and 29. If the clock pulse 35 is made equal to the signal 35 to the counter 68 and to the signal 80 to the latch 79, the input signals 38 and 81 are synchronized with each other by the AND gate 71.

Figure 15:
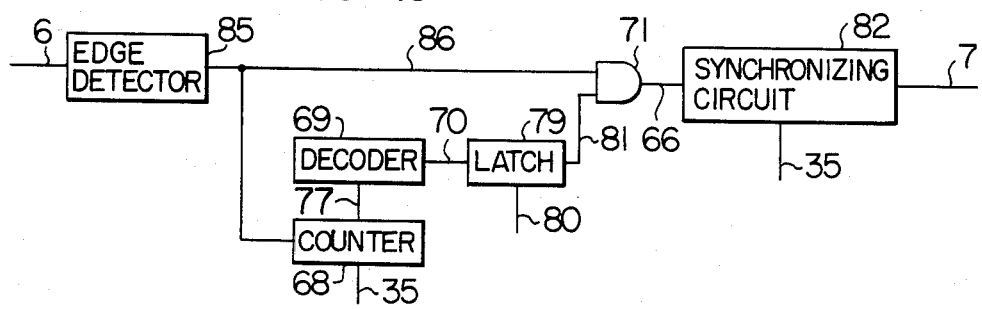
FIG. 15 is a block diagram of a fifth embodiment of this invention.

FIG. 15 shows a fifth embodiment of this invention, which is capable of eliminating any disturbance of synchronization due to dropout or a signal transmission characteristic of a transmission system and expanding jitter margin for providing a higher quality data synchronizing circuit.

In FIG. 15, the input digital signal 6 is supplied to a falling edge detecting circuit 85 to produce a falling edge signal 86 which then clears the counter 68. This counter 68 counts the signal during the time except the clear time. The output 7 from the counter 68 is supplied to the decoder 69 to produce the decoded output 70. The output 70 is latched by the latch circuit 79 in response to the signal 80. This latched output 81 and the falling edge signal 86 are supplied to the AND gate 71 to produce the coincidence output 66, which is then supplied as a synchronizing signal to the synchronizing circuit 82 together with the clock pulse 35 so as to produce the data strobe pulse 16.

The operation of the arrangement of FIG. 15 will be described with reference to the timing chart of FIG. 16. It is assumed that the input digital signal 6 is a sequence of pulses with period T and has shift of edge timing at points A and B.

Figure 16:
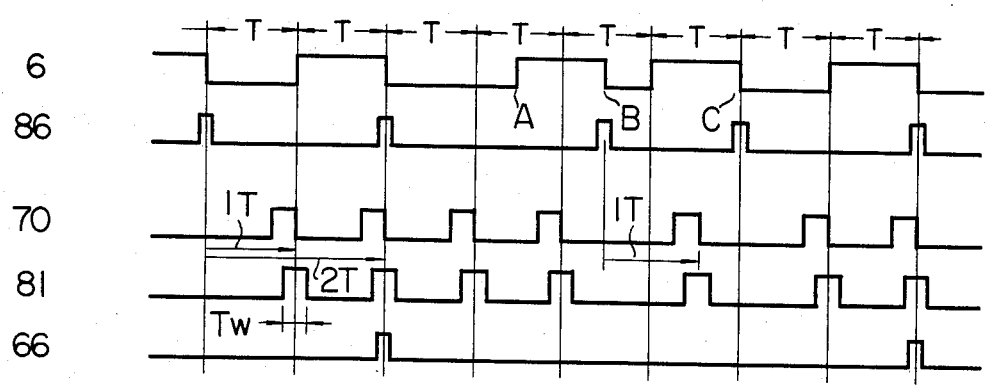
FIG. 16 is a timing chart therefor.

In FIG. 16, there are shown the trailing edges 86 associated with the input digital signal, the decoded output 70 resulting from decoding the output of the counter 68 which is reset by the falling edge 86, and the output 81 resulting from latching the output 70. The output 81 is set to occur nT after reset time (hereinafter, $n \geq 1$ and n is an integer) and has width $T_W$. The output 66, as shown in FIG. 16, occurs upon coincidence of the latched output 81 with the falling edge 86.

Figure 17:
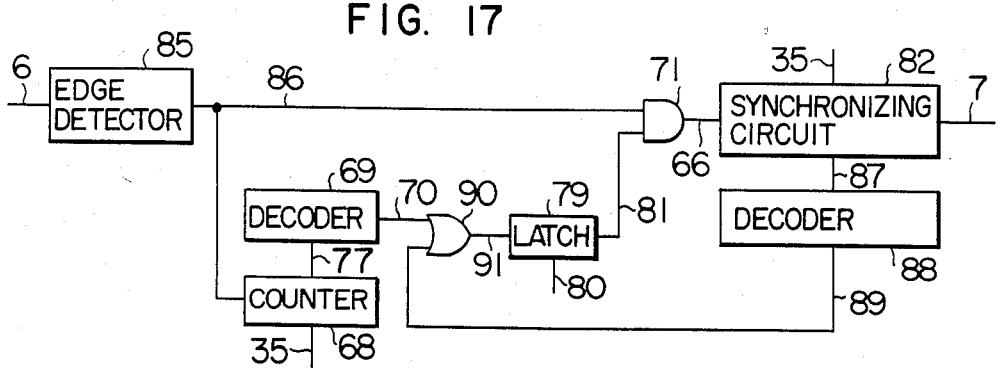
FIG. 17 is a block diagram of a sixth embodiment of this invention.

However, the normal falling edge signal at point C next to point B is also eliminated. FIG. 17 shows a sixth embodiment of this invention by which this elimination is prevented.

The arrangement of FIG. 17 is the addition of a decoder 88 and an OR gate 90 in that of FIG. 15. The decoder 88 decodes the output 87 of the synchronizing circuit 82 to produce a decoded output 89 and the OR gate 90 is supplied with the decoded output 70 and 89 and produces an output 91. Thus, the coincidence output 66 is produced from the AND gate 71 which are supplied with the trailing edge signal 86 and the latched output 81 resulting from latching the OR output 91 in response to the signal 80.

Figure 18:
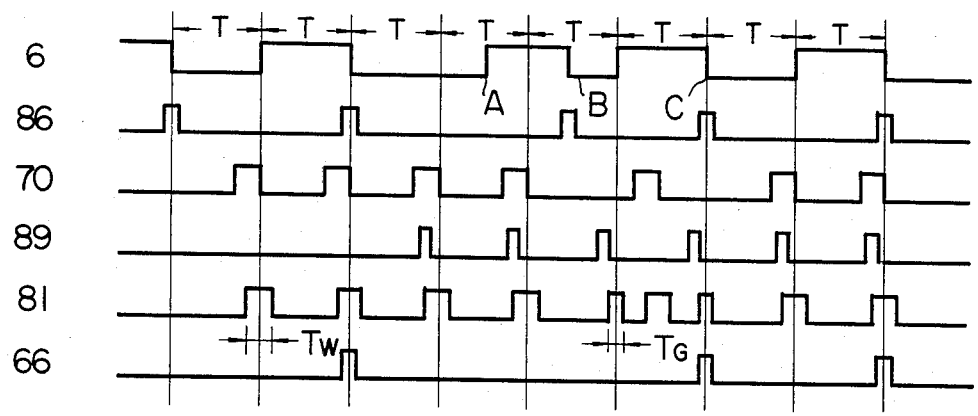
FIG. 18 is a timing chart therefor.

The operation of the arrangement of FIG. 17 will be described with reference to the timing chart of FIG. 18. The input digital signal is the same as that in FIG. 15. The latched output 81 is set to occur nT after the counter 68 has been cleared and to have width $T_W$. The decode output 89 can be produced nT after the coincidence output 66 has been produced with width $T_G$ because it is a decoded value from the synchronizing circuit 82 of which operation is phase synchronized by the coincidence output 66.

The logical sum of the decoded outputs 70 and 89 is the output 81. Therefore, the signal at trailing edge C next to the abnormal edge B is passed as a phase synchronizing signal.

Figure 19:
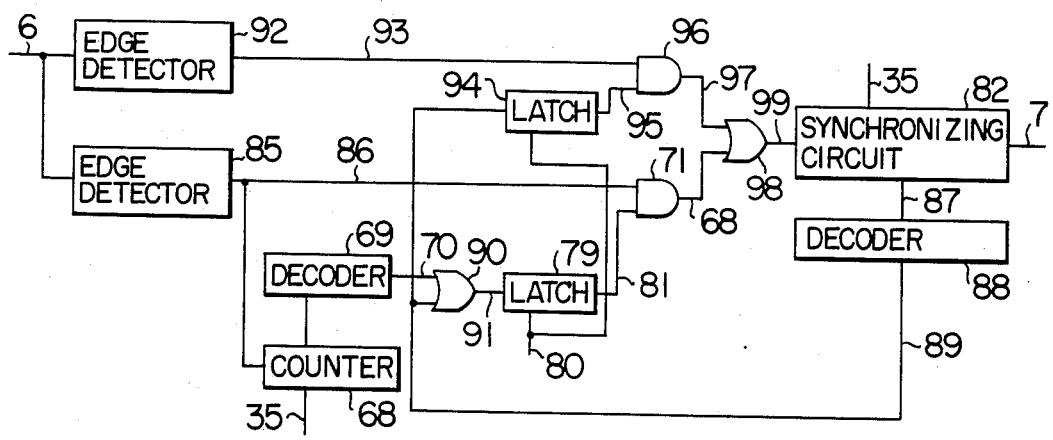
FIG. 19 is a block diagram of a seventh embodiment of this invention.

FIG. 19 shows a seventh embodiment of this invention. The arrangement is the addition of an extracting circuit in that of FIG. 17. This extracting circuit for also extracting as a phase synchronizing signal the leading edge which never disturb the phase synchronized by the normal falling edge. Specifically there are added a detection circuit 92 for detecting the rising edge of the input digital signal 6 to produce a rising edge signal 93, a latch circuit 94 for latching the decoded output 89 in response to the signal 80 to produce a latched output 95, an AND gate 96 which is supplied with the latched output 95 and the rising edge signal 93 and produces a coincidence output 97, and an OR gate 98 which is supplied with the coincidence output 97 and the coincidence output 66 to produce a phase synchronizing signal 99 as an OR output.

Figure 20:
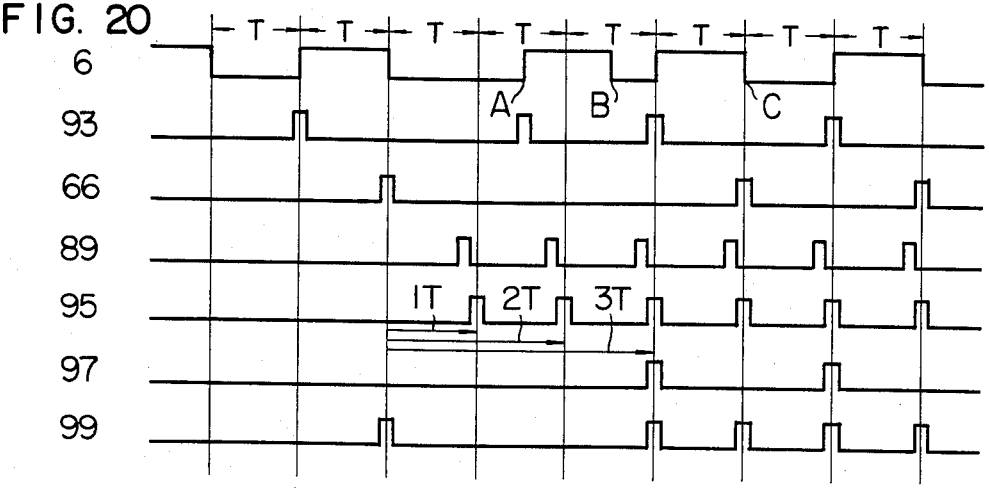
FIG. 20 is a timing chart therefor.
Figure 21A:
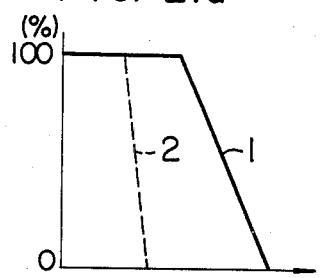
Figure 21B:
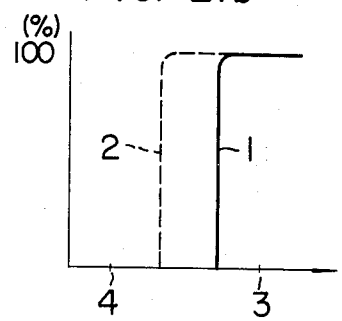
Figure 22:
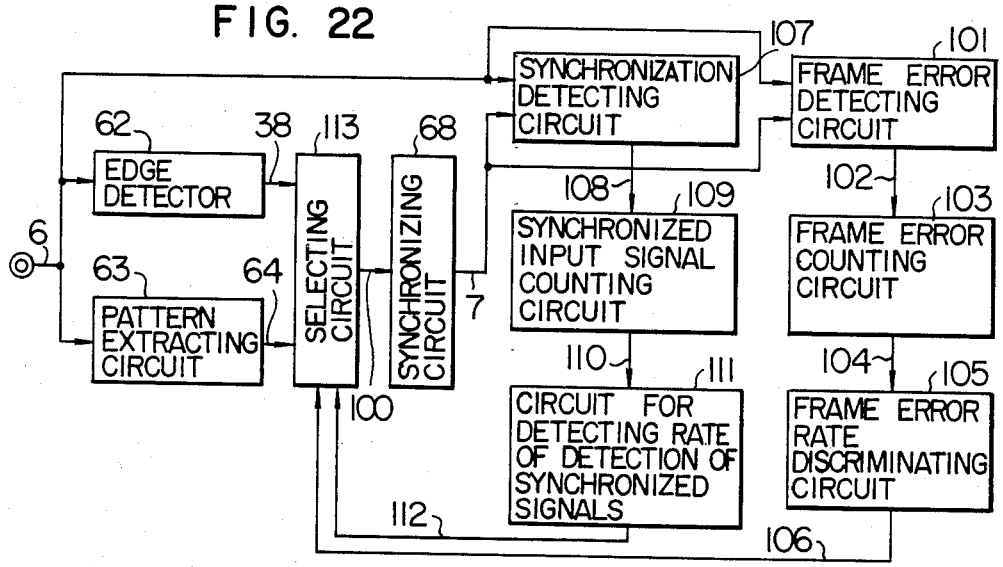
Figure 23:
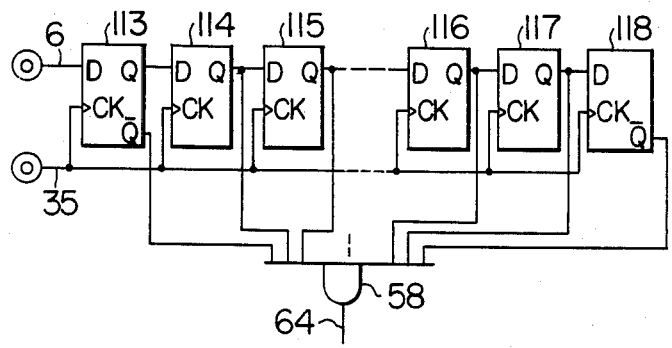
Figure 24:
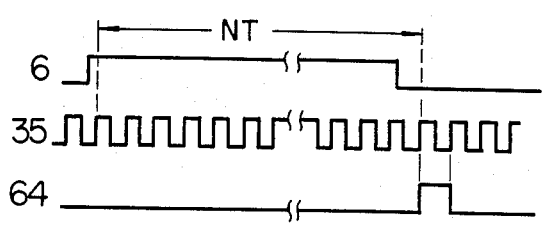
Figure 25:
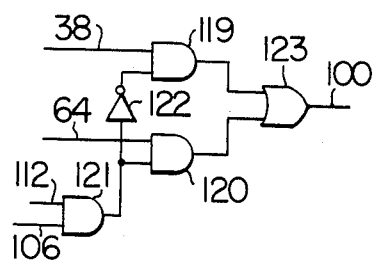
Figure 26:
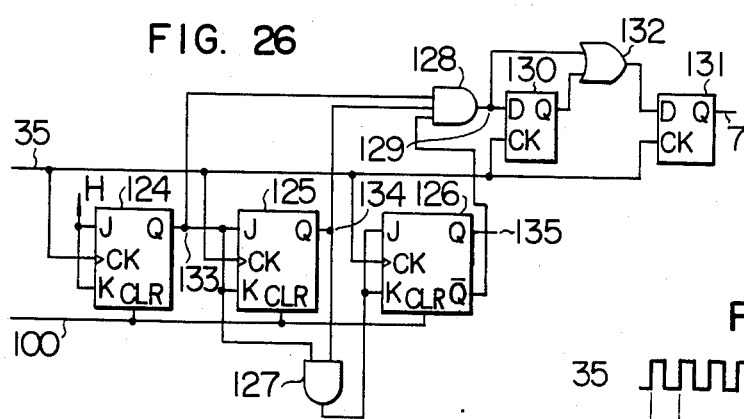
Figure 27:
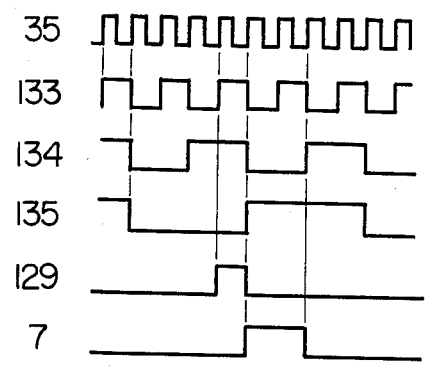
Figure 28:
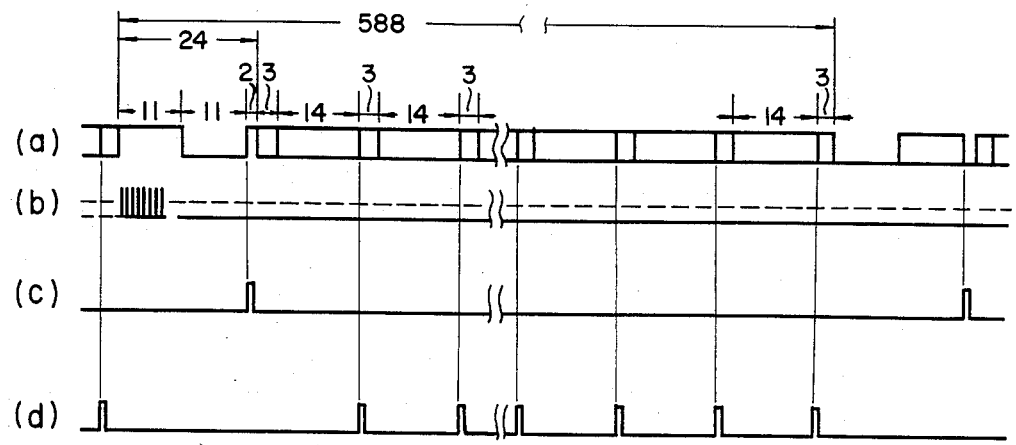
Figure 29:
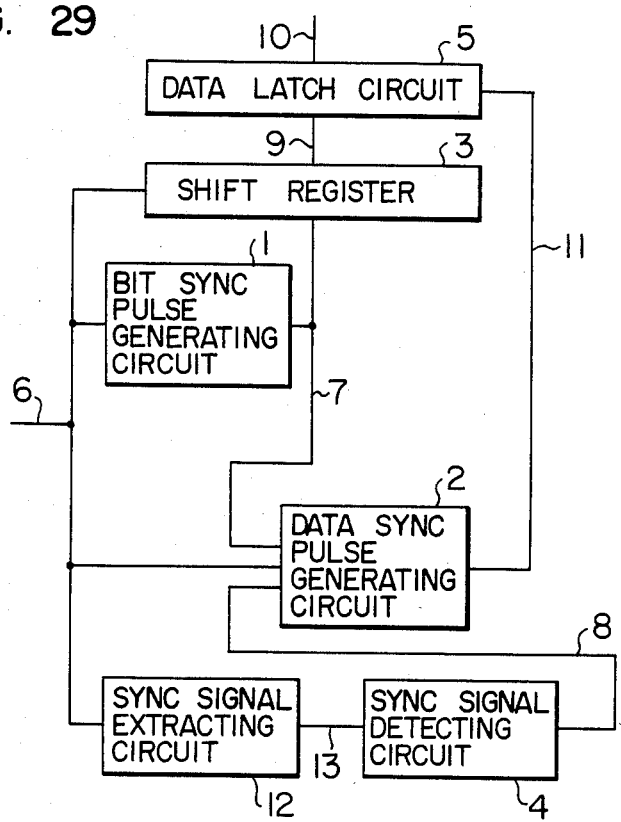
Figure 30:
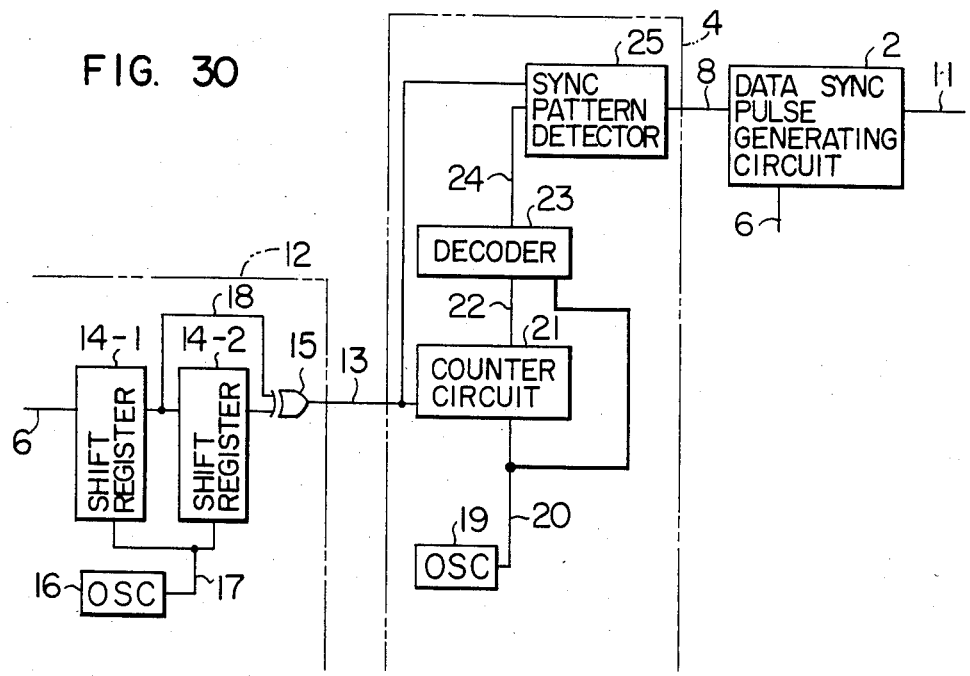
Figure 31:
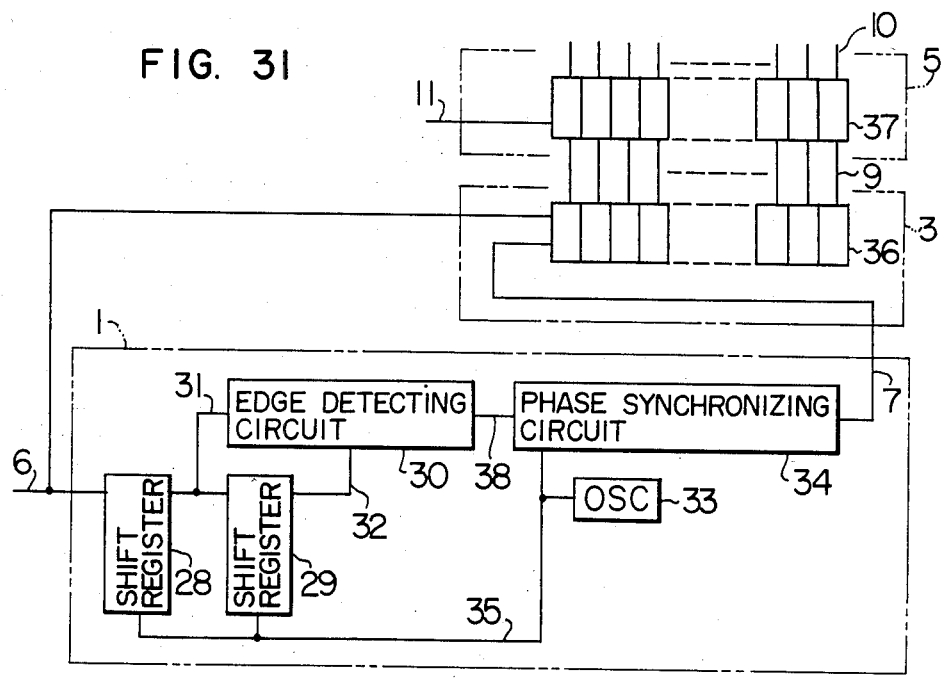
Figure 32:
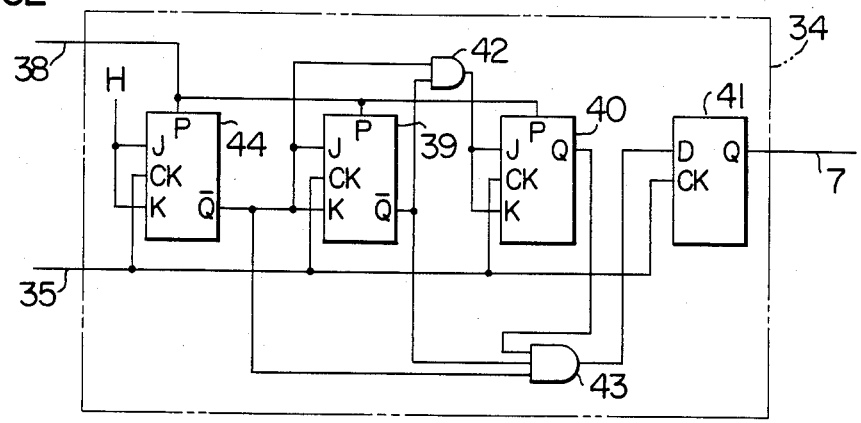
Figure 33:
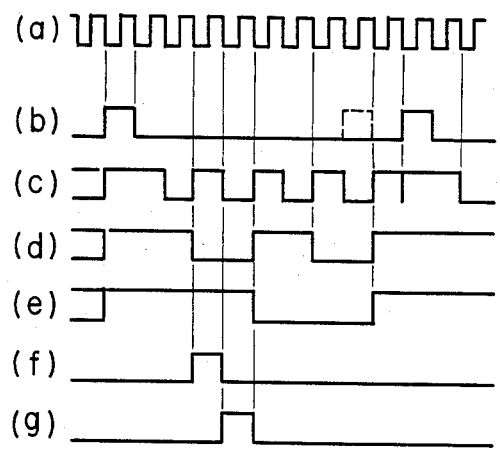
Figure 35:
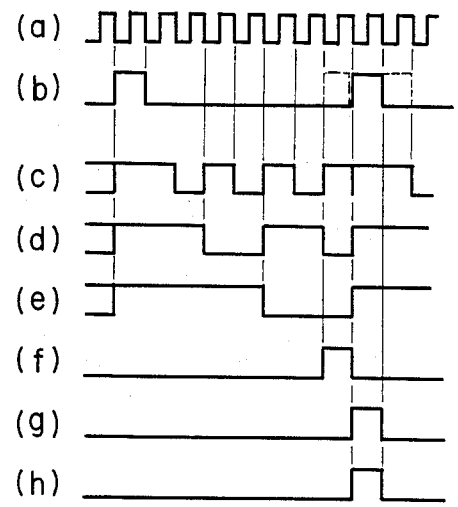
Figure 34:
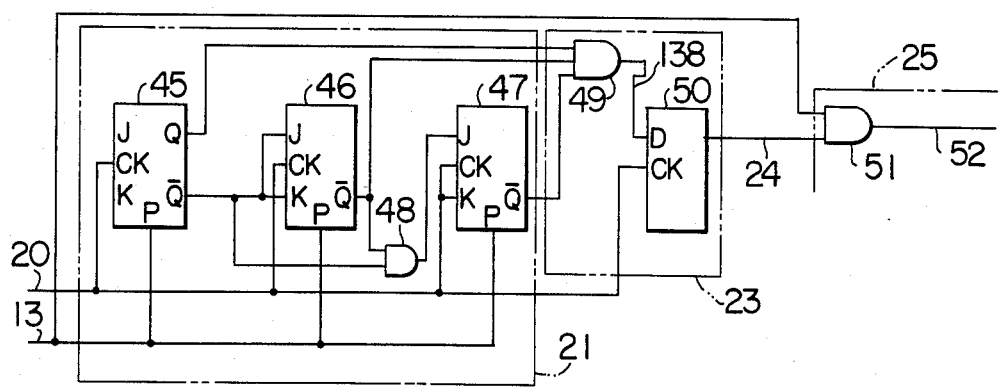

The operation of the arrangement of FIG. 19 will be described in detail with reference to the timing chart of FIG. 20. In FIG. 20, there are shown the rising edge signal 93 of the same input digital signal 6 as stated above, the coincidence output 68, decoded output 89 previously described, the output 95 resulting from latching the decoded output 89, the coincidence output 97 resulting from the logical product of the latched output 95 and the rising edge signal 93 because the latched output 95 occurs nT after the phase synchronizing signal has been produced, and has width of $T_G$. The logical sum 99 of the coincidence outputs 97 and 68 is a phase synchronizing signal.

The falling edge signal 86 in FIGS. 15 and 17 may be changed to the rising edge signal, and the falling edge signal 86 and the coincidence output 93 may be interchanged.

What is claimed is:

1. A digital data synchronization circuit, for producing a discrimination clock signal for use in reproduction of a digital signal including a combination of pulses each having a pulse width related to a unit pulse width and defined by rising and falling pulse edges, the digital data synchronization circuit comprising:
   an oscillation circuit for providing periodic pulses;
   a shift register for receiving an input digital signal which may have been subjected to distortion, said shift register being connected to said oscillation circuit and having a plurality of stages through which said input digital signal is shifted under clock control by said periodic pulses received from said oscillation circuit;
   a logic circuit connected to receive the output of said shift register for generating a reset pulse signal containing pulses each appearing only when the output of said shift register represents a value corresponding to a data pulse having a pulse width related to a unit pulse width to thereby discriminate the length of a pulse as measured from said rising pulse edge and/or falling pulse edge of each pulse of said input digital signal; and
   a synchronizing circuit connected to receive the output of said oscillation circuit and said reset pulse signal for generating a clock pulse signal having a period equal to said unit pulse width as said discrimination clock signal irrespective of distortion in said input digital data signal, wherein said periodic pulses from said oscillation circuit are applied to said shift register without being phase locked to said input digital signal.

2. A digital data synchronization circuit according to claim 1, in which the number of said plurality of stages of said shift register is such that said shift register may accomodate data having a duration which is related to said unit pulse width, so that said logic circuit generates said reset pulse only when the output of said shift register reaches a value corresponding to a data pulse having a pulse width related to said unit pulse width.

3. A digital data synchronization circuit according to claim 1, in which the number of said plurality of stages of said shift register is such that said shift register may accomodate data having a duration which is three times the duration of said unit pulse width, said logic circuit including three logic circuit units each connected to a different series of successive stages of said shift register corresponding to said unit pulse width and further including an AND circuit to which the outputs of said three logic circuit units are fed, the output of said AND circuit being fed to said synchronizing circuit so that said reset pulse signal is generated when the output of each of said three logic circuit units reaches a value corresponding to a data pulse having a pulse width related to said unit pulse width.

4. A digital data synchronization circuit for producing a discrimination clock signal for use in reproduction of a digital signal including a combination of pulses each having a pulse width related to a unit pulse width and defined by rising and falling pulse edges, the digital data synchronization circuit comprising:

an edge detector for receiving an input digital signal which may have been subjected to distortion and for generating a first pulse signal containing pulses representative of other rising pulse edges and/or falling pulse edges in said input digital signal, said input digital signal possibly containing at least one pulse having a pulse width not related to said unit pulse width;

a synchronizing circuit for generating a clock pulse signal having a period equal to said unit pulse width of the digital signal;

a clock source for providing periodic pulses to said synchronizing circuit;

a counter for counting the periodic pulses from said clock source under control of said first pulse signal from said edge detector;

a first decoder connected to receive the instantaneous output of said counter for generating therefrom a second pulse signal containing pulses each appearing when the output of said counter reaches a value related to said unit pulse width to thereby determine the length of time as measured from said rising pulse edge and/or falling pulse edge of each of said pulses of said first pulse signal; and a coincidence circuit connected to receive said first pulse signal from said edge detector and to receive said second pulse signal from said first decoder for gating said first pulse signal with said second pulse signal to thereby produce a reset signal only when said input signal is not distorted, said counter being immediately changed away from said value related to said unit pulse width with said first decoder immediately reflecting said change, said reset signal being applied as the output of said coincidence circuit to control said synchronizing circuit, whereby a clock pulse signal having a period equal to said unit pulse width is generated from said synchronizing circuit as said discrimination clock signal irrespective of distortion in said input digital data signal.

5. A digital data synchronization circuit for producing a discrimination clock signal for use in reproduction of a digital signal including a combination of pulses each having a pulse width related to a unit pulse width and defined by rising and falling pulse edges, the digital data synchronization circuit comprising:

an edge detector for receiving an input digital signal which may have been subjected to distortion and for generating a first pulse signal containing pulses representative of other rising pulse edges and/or falling pulse edges in said input digital signal, said input digital signal possibly containing at least one pulse having a pulse width not related to said unit pulse width;

a synchronizing circuit for generating a clock pulse signal having a period equal to said unit pulse width of the digital signal;

a clock source for providing periodic pulses to said synchronizing circuit;

a counter for counting the periodic pulses from said clock source under control of said first pulse signal from said edge detector;

a first decoder connected to receive the instantaneous output of said counter for generating therefrom a second pulse signal containing pulses each appearing when the output of said counter reaches a value related to said unit pulse width to thereby determine the length of time as measured from said rising pulse edge and/or falling pulse edge of each of said pulses of said first pulse signal; and a coincidence circuit connected to receive said first pulse signal and said second pulse signal to produce therefrom a reset signal, which is applied as the output of said coincidence circuit to control said synchronizing circuit, whereby a clock pulse signal having a period equal to said unit pulse width is generated from said synchronizing circuit as said discrimination clock signal irrespective of distortion in said input digital data signal, wherein said first pulse signal from said edge detector is representative of the rising pulse edges or the falling pulse edges in said input digital signal, and further including a second decoder connected with said synchronizing circuit for generating a third pulse signal from the output of said synchronizing circuit, said third pulse signal having a period equal to said unit pulse width, and a logical sum circuit interposed between said first decoder and said coincidence circuit so that said second pulse signal from said first decoder and said third pulse signal from said second decoder are fed to said logical sum circuit and the logical sum output of said logical sum circuit is applied to said coincidence circuit.

6. A digital data synchronization circuit according to claim 5, further comprising another edge detector connected to receive said input digital signal for generating a fourth pulse signal containing pulses representative of the falling pulse edges or the rising pulse edges in said input digital signal, another coincidence circuit connected to receive said third and fourth pulse signals for producing another reset signal, and another logical sum circuit interposed between said another coincidence circuit and said synchronizing circuit so that both of said reset signals from said coincidence circuits are fed to said another logical sum circuit and the logical sum output of said another logical sum circuit is fed to said synchronizing circuit.

7. A digital data synchronization circuit according to claim 6, further comprising a latch circuit interposed between said logical sum circuit and said coincidence circuit so that said logical sum output of said logical sum circuit is applied to said coincidence circuit via said latch circuit, and comprising another latch circuit interposed between said second decoder and said another coincidence circuit so that said third pulse signal from said second decoder is fed to said another coincidence circuit via said another latch circuit.

8. A digial data synchronization circuit, for producing a discrimination clock signal for use in reproduction of a digital signal including a combination of pulses each having a pulse width related to a unit pulse width and defined by rising and falling pulse edges, the digital data synchronization circuit comprising:

an edge detector for receiving an input digital signal which may have been subjected to distortion and for generating a first pulse signal containing pulses representative of other rising pulse edges and/or falling pulse edges in said input digital signal, said input digital signal possibly containing at least one pulse having a pulse width not related to said unit pulse width;

a synchronizing circuit for generating a clock pulse signal having a period equal to said unit pulse width of the digital signal;

a clock source for providing periodic pulses to said synchronizing circuit;

a counter for counting the periodic pulses from said clock source under control of said first pulse signal from said edge detector;

a first decoder connected to receive the instantaneous output of said counter for generating therefrom a second pulse signal containing pulses each appearing when the output of said counter reaches a value related to said unit pulse width to thereby determine the length of time as measured from said rising pulse edge and/or falling pulse edge of each of said pulses of said first pulse signal; and a coincidence circuit connected to receive said first pulse signal and said second pulse signal to produce therefrom a reset signal which is applied as the output of said coincidence circuit to control said synchronizing circuit, whereby a clock pulse signal having a period equal to said unit pulse width is generated from said synchronizing circuit as said discrimination clock signal irrespective of distortion in said input digital data signal; further comprising a latch circuit interposed between said first decoder and said coincidence circuit so that said second pulse signal is fed to said coincidence circuit via said latch circuit.

9. A digital data synchronization circuit according to claim 5, further comprising a latch circuit interposed between said logical sum circuit and said coincidence circuit so that said logical sum output of said logical sum circuit is applied to said coincidence circuit via said latch circuit.

* * * * *